United States Patent
Snyder et al.

(10) Patent No.: US 10,751,988 B1
(45) Date of Patent: Aug. 25, 2020

(54) ADDITIVE MANUFACTURED WAVEGUIDES

(71) Applicant: MADE IN SPACE, INC., Moffett Field, CA (US)

(72) Inventors: Michael Snyder, Mountain View, CA (US); Andrew Rush, St. Johns, FL (US); Derek Thomas, Sunnyvale, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 430 days.

(21) Appl. No.: 15/372,204

(22) Filed: Dec. 7, 2016

Related U.S. Application Data

(60) Provisional application No. 62/263,840, filed on Dec. 7, 2015, provisional application No. 62/266,346, filed on Dec. 11, 2015.

(51) Int. Cl.
| | |
|---|---|
| *B33Y 30/00* | (2015.01) |
| *B33Y 10/00* | (2015.01) |
| *B29D 11/00* | (2006.01) |
| *B33Y 80/00* | (2015.01) |

(52) U.S. Cl.
CPC ........ *B33Y 30/00* (2014.12); *B29D 11/00663* (2013.01); *B29D 11/00875* (2013.01); *B33Y 10/00* (2014.12); *B33Y 80/00* (2014.12)

(58) Field of Classification Search
CPC ........ B29D 11/00663; B29D 11/00875; B33Y 30/10; B33Y 10/00; B33Y 80/00; B33Y 70/00
See application file for complete search history.

(56) References Cited

U.S. PATENT DOCUMENTS

| | | | |
|---|---|---|---|
| 9,004,799 B1 | 4/2015 | Tibbits | |
| 9,190,706 B2 | 11/2015 | Nath et al. | |
| 2005/0232561 A1* | 10/2005 | Murofushi | G02B 6/02033 385/125 |
| 2007/0036653 A1* | 2/2007 | Bak | F03D 1/0641 416/98 |
| 2008/0133040 A1 | 6/2008 | Boyden et al. | |
| 2012/0084968 A1 | 4/2012 | Nath et al. | |
| 2014/0035995 A1 | 2/2014 | Chou et al. | |
| 2014/0314954 A1 | 10/2014 | Lewis et al. | |
| 2015/0097746 A1 | 4/2015 | Wilson et al. | |
| 2015/0130665 A1 | 5/2015 | Lacaze et al. | |
| 2018/0030235 A1* | 2/2018 | Slep | C08K 3/042 |
| 2018/0036939 A1* | 2/2018 | Sundaresan | B33Y 70/00 |
| 2018/0272599 A1 | 9/2018 | Rodriguez et al. | |

OTHER PUBLICATIONS

Lee et al, "'4D Printing' Adaptive Materials," Smart Mater. Struct. 23, 095044, http://www.kurzweilai.net/4d-printing-adaptive-materials, 2013.
Correa et al., "3D-Printed Wood: Programming Hygroscopic Material Transformations," 3D Printing and Additive Manufacturing, vol. 2, No. 3, 2015.

* cited by examiner

*Primary Examiner* — Mathieu D Vargot
(74) *Attorney, Agent, or Firm* — Terry M. Sanks, Esq.

(57) ABSTRACT

A system comprising an additive manufacturing device to create a macrostructure as a continuous piece, an applicator to apply a conductive coating to an inner surface of the macrostructure, and a signal attenuation tuner to attenuate a signal by modification of a physical dimension of the macrostructure. A method and another system are also disclosed.

26 Claims, 5 Drawing Sheets

ADDITIVE MANUFACTURED WAVEGUIDES

CROSS-REFERENCE TO RELATED APPLICATIONS

This application claims the benefit of U.S. Provisional Application No. 62/263,840 filed Dec. 7, 2015 and U.S. Provisional Application No. 62/266,346 filed Dec. 11, 2015, both incorporated herein by reference in their respective entirety.

BACKGROUND

Embodiments relate to additive manufacturing and, more particularly, to a waveguide made with additive manufacturing resulting in a lightweight waveguide capable of being manufactured with diverse shapes while maintaining acceptable tolerances.

A waveguide is a structure that guides waves, such as electromagnetic waves or sound waves where waves, or signal, are able to propagate with minimal loss of energy by restricting expansion to one dimension or two dimensions. Without the physical constraint of a waveguide, signals will typically dissipate according to the inverse square law as they expand into three-dimensional space.

Traditionally, waveguide construction involves metalwork including bending, Computer Numerically Controlled ("CNC") machine processing, die-cast processing, and taping. Once segmented sections are constructed, they are hand assembled to create the final product. Precision production of metal waveguides is a difficult and expensive process because of the complexity of producing the needed shapes with appropriate shape tolerances. Also, metal waveguides add a significant amount of weight which may limit allowable weight to other components or subsystems when weight requirements are a concern such as, but not limited to, when used on a space vehicle.

Manufacturers and users of waveguides would benefit from lighter weight waveguides in which more diverse shapes can be produced. With respect to waveguides used in applications where weight is a limiting factor, this can lead to dramatic reductions in weight while also providing designers an ability to utilize a volume where the waveguide is to be used more effectively as waveguides may be better designed to fit within the volume of space. Manufacturers and users would also benefit where manufacturing of lightweight waveguides may be an automated or semi-automated process without direct human involvement in creating a final waveguide.

SUMMARY

Embodiments relate to a system and a method creating a continuous macrostructure. The system comprises an additive manufacturing device to create a macrostructure as a continuous piece. The system also comprises an applicator to apply a conductive coating to an inner surface of the macrostructure. The system further comprises a signal attenuation tuner to attenuate a signal by modification of a physical dimension of the macrostructure.

The method comprises manufacturing the macrostructure with an additive manufacturing process. The method further comprises applying a conductive coating to an inner surface of the macrostructure with an applicator. The method also comprises tuning the macrostructure with a signal attenuation tuner by modification of a physical dimension of the macrostructure.

Another system comprises an additive manufacturing device to create a macrostructure wherein the additive manufacturing device initially manufactures the macrostructure with at least one of a solid inner and solid outer wall and a solid inner and porous outer wall, and a porous inner and porous outer wall. The system also comprises an applicator to apply a conductive coating to an inner surface of the macrostructure and to apply a solvent to the inner wall when the inner wall is porous to create a solid inner wall. The system also comprises a signal attenuation tuner to attenuate a signal by modification of a physical dimension of the macrostructure.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
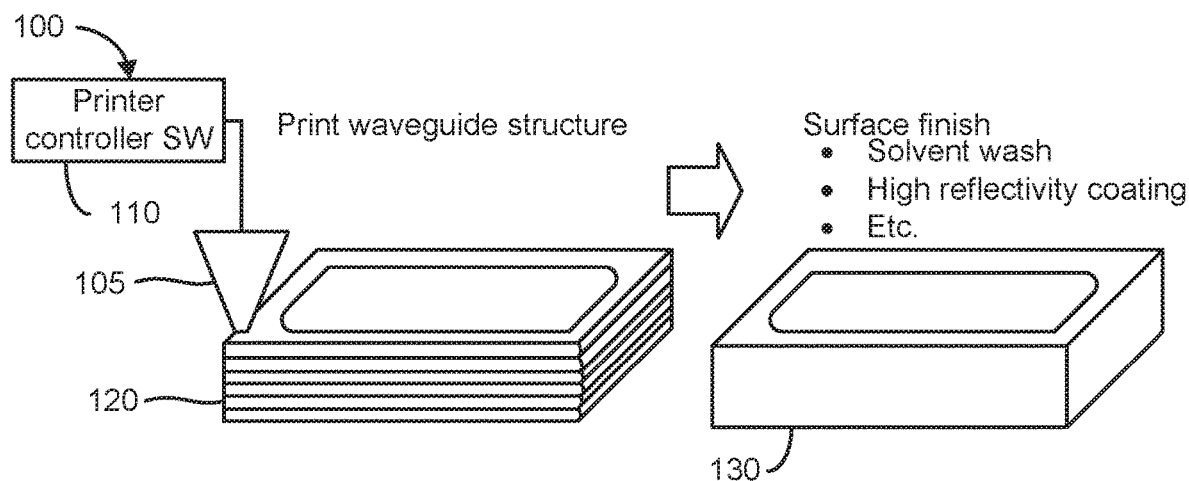
FIG. 1 shows a block diagram of a manufacturing process of an additive manufactured waveguide.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Though the description below is specific to a waveguide, the embodiments are also applicable to a macrostructure. Therefore, the use of these terms is interchangeable.

FIG. 1 shows a block diagram of a manufacturing process of an additive manufactured waveguide or macrostructure. As illustrated, an additive manufacturing printer 100 (represented by a print head 105 and controller 110) creates a waveguide 120 by additively layering the structure of the waveguide 120. The material being layered may be a plastic such as, but not limited to, a thermoplastic material, or another lightweight material. Thus, the material used to create the structure of the waveguide 120 may be considered the primary matrix of the waveguide. In an embodiment, a plurality of materials may be used wherein certain layers comprise a different material. More specifically, selective layering may be applied to create the waveguide 120.

Figure 2:
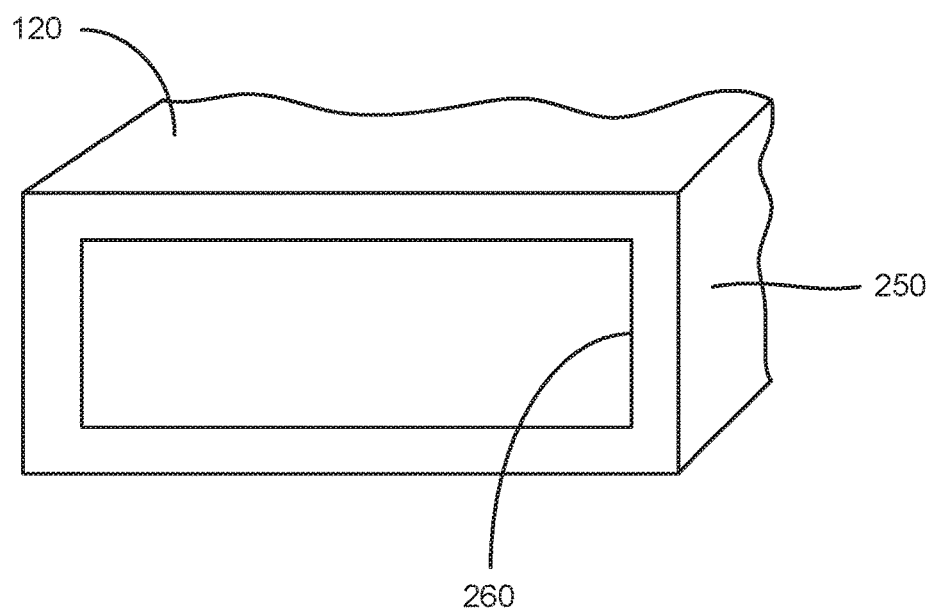
FIG. 2 shows an embodiment of a cross section of a section of a complex waveguide.
Figure 3:
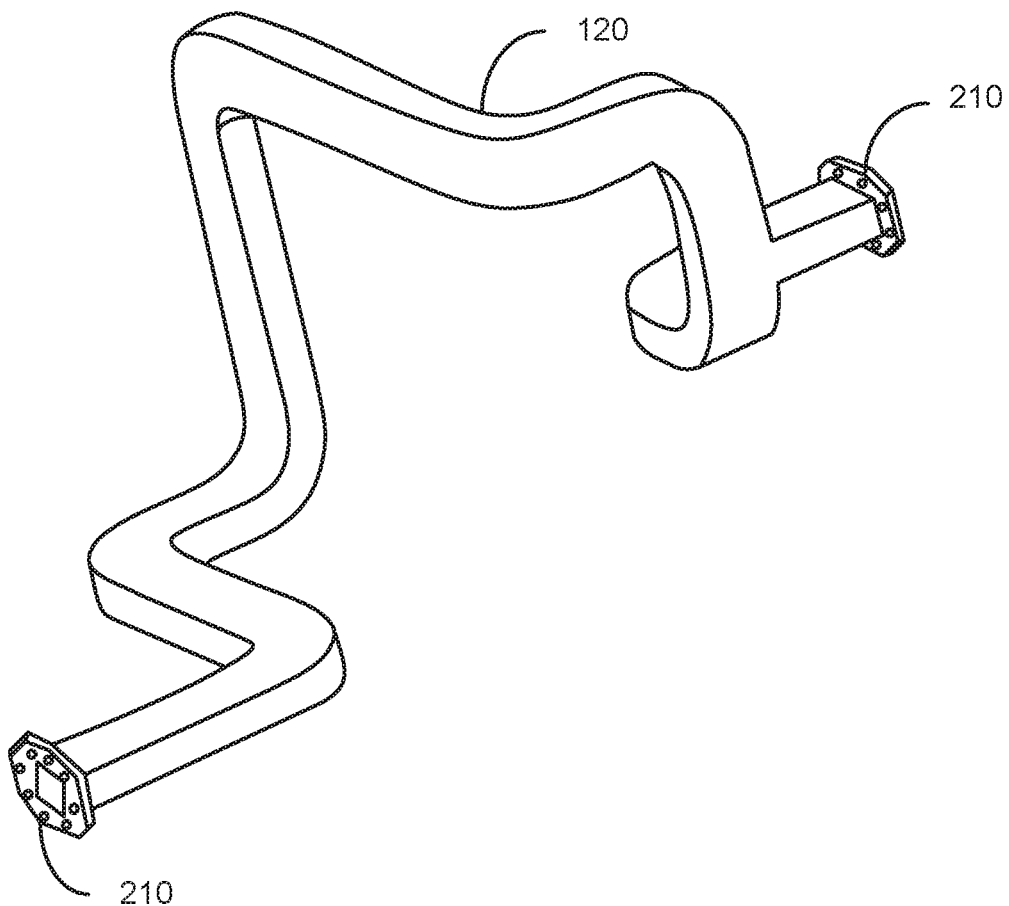
FIG. 3 shows an embodiment of the complex waveguide.

FIG. 2 shows an embodiment of a cross section of a section of the waveguide shown in FIG. 3. In an embodiment, the material layered may be a porous material, to further provide for a reduced weight of the waveguide. As a non-limiting example, an outer wall 250 or surface of the waveguide 120 may be made porous or arranged with a non-smoother surface. When finished the inner wall 260 or surface is a solid wall, preferably smooth, as discussed further herein. However, when first additively manufactured, the inner wall 260 may also be porous, but later transitioned to a smooth solid wall by application of a solvent 330 or surface applicant, as discussed below.

As opposed to manufacturing a waveguide where it includes a plurality of segments in which adjacent segments are connected at a flange 210, where an example of the flange 210 is shown in FIG. 3, as disclosed herein, the waveguide 120 may be manufactured as a continuous component. Operationally, a continuous manufactured waveguide minimizes losses that may result where adjacent flanges are mechanically connected. By reducing a need for additional flanges, further weight reduction is realized.

Once the waveguide 120 is structurally manufactured, a finish 130 may be applied to provide for the conductivity needed for signal attenuation. As explained in more detail below, the finish may comprise a solvent wash followed by a coating.

FIG. 4 shows an embodiment of a complex waveguide. As illustrated, multiple bends are included in the waveguide 120, yet this configuration may be additively manufactured as a single piece. As discussed above, multiple segments where each end of a segment has a flange that connects to a flange of an adjacent piece are no longer needed. More specifically, the structure shown would be very difficult to produce using a traditional manufacturing approach for making a waveguide. Such a complex waveguide made with a traditional manufacturing approach would include multiple assembly joints. The joints would reduce signal strength and increase weight. Thus, utilizing embodiments disclosed herein more complex structures may be made resulting in end-to-end waveguides without multiple assembly points. Furthermore, where space for placement of the waveguide 120 is limited, the structure of the waveguide may be adapted to not interfere with other critical components of an overall system. This may be beneficial with, where such overall systems must meet certain size requirements, such as, but not limited to, space and weight limitations that are required for a space vehicle or space structure. Physical space requirements may be an issue when the overall system is launched into space from earth where the launch vehicle may define size and weight limitations for the overall system.

Figures 4A, 4B:
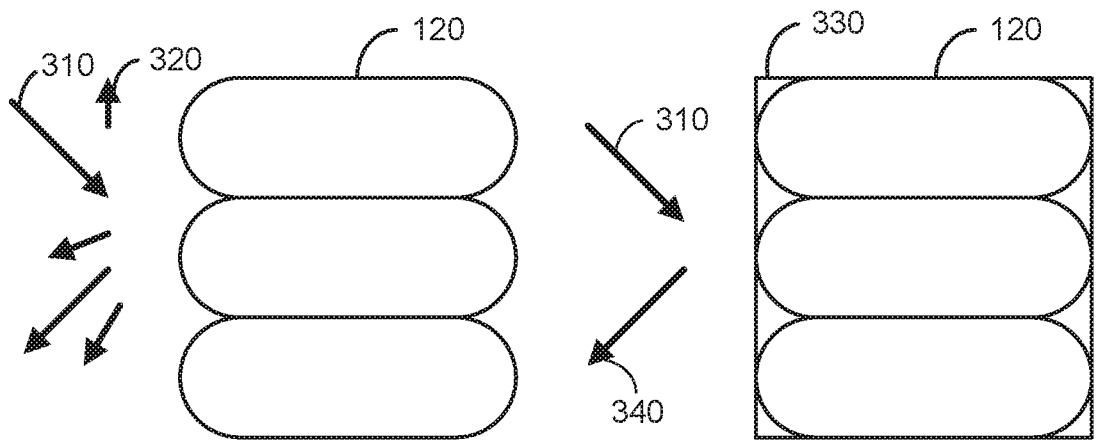
FIG. 4A shows an embodiment of a side wall of a waveguide after being additively manufactured.
FIG. 4B shows an embodiment of the side wall of the waveguide after a surface modification is applied to the surface.

FIG. 4A shows an embodiment of a side wall of a waveguide after being additively manufactured and FIG. 4B shows an embodiment of the side wall of the waveguide after a surface modification is applied to the surface. An additive manufactured produced part often has surface roughness as a result of the layer-by-layer production method used to create the part. The same may be true of an additive manufactured waveguide 120. Additionally, when a powder production additive manufacturing method is used, it too may also have added surface roughness as a result of surface-level porosity. As illustrated in FIG. 4A, a signal 310 that reaches the wall may propagate as many signals in a plurality of directions.

As illustrated in FIG. 4B, once a surface modification technique is applied to the waveguide structure such as, but not limited to, the solvent 330, increased consistency of the surface may be realized as the surface may be transformed to a solid surface. Thus, the signal 310 may propagate in a desired direction 340 within the waveguide. As a non-limiting example, the solvent 330 such as, but not limited to, an organic solvent, may be used to reduce the surface roughness of the material of the waveguide such as, but not limited to, the plastic material. The solvent 330 may or may not leave the surface porous, which can also be used to increase adhesion to the reflective coating in the next step.

Figure 5:
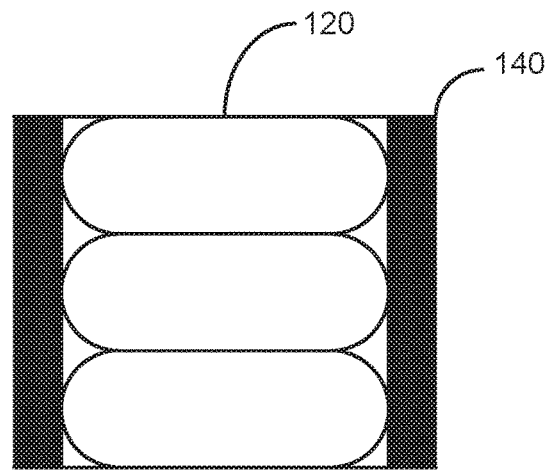
FIG. 5 shows an embodiment of the side wall of the waveguide with a conductive coating applied.

FIG. 5 shows an embodiment of the side wall of the waveguide with a conductive coating applied. A conductive coating 410 such as, but not limited to, a highly conductive coating, may be applied to increase an ability to transmit a signal through the waveguide. The conductive coating 410 may be a metal. The coating 410 will not add much weight to the waveguide 120, thus still resulting in reduced weight when compared to the waveguide made entirely of the coating 410. The coating 410 may be applied with the additive manufacturing process. Thus, the coating 410 may be multilayered. By applying multiple layers of coating, any particular layer may have a different property than an adjacent layer, Thus, both the waveguide's primary material and coating 410 may be selectively layered to meet a specific requirement of the waveguide 120.

Embodiments of the waveguide 120 disclosed herein are tunable to achieve a desired operational parameter. Tuning may be performed post processing. A stimuli or modality may be applied to the waveguide to change a radius of the waveguide at any particular location along the waveguide or along an entire waveguide to select signal attenuation level. Non-limiting examples of the stimuli include, but are not limited to, pressure and temperature (namely, heat). Pressure may be applied by an object pressed or attached to the waveguide such as, but not limited to, a clamp or clip. A plurality of clamps may be applied at various locations along the waveguide at areas where signal attenuation level is to be adjusted. Thus, dimensional changes may be localized to modify signal attenuation that affects attenuation throughout the waveguide. In another non-limiting example, the waveguide, or at least a section of the waveguide, may be exposed to an environment that will affect the waveguide material. Since the waveguide may be made of a malleable material such as, but not limited to, plastic, a vapor gas environment may be used to alter a shape, and hence affect attenuation of the waveguide. In another non-limiting example, a smart material, as disclosed in U.S. application Ser. No. No. 15/372,150 entitled "SYSTEM AND METHOD USING EMBEDDED SMART MATERIALS IN THREE-DIMENSIONAL (3D) PRINTED COMPONENTS" filed concurrently with this application and which also claims priority to U.S. Provisional No. 62/263,840 filed Dec. 7, 2015) incorporated herein by reference, may be integrated within the waveguide and then activated to change a form of the waveguide as discussed above. Thus, the smart material may function as a sensor to detect at least one of an environmental condition and a signal to cause the smart material to at least one of bend, fold, shift, rotate and pivot which in turn causes the feedstock to change form in response to the at least one of bend, fold, shift, rotate and pivot of the smart material to a desired tune, and wherein the smart material is arranged to reconfigure the feedstock.

Figure 6:
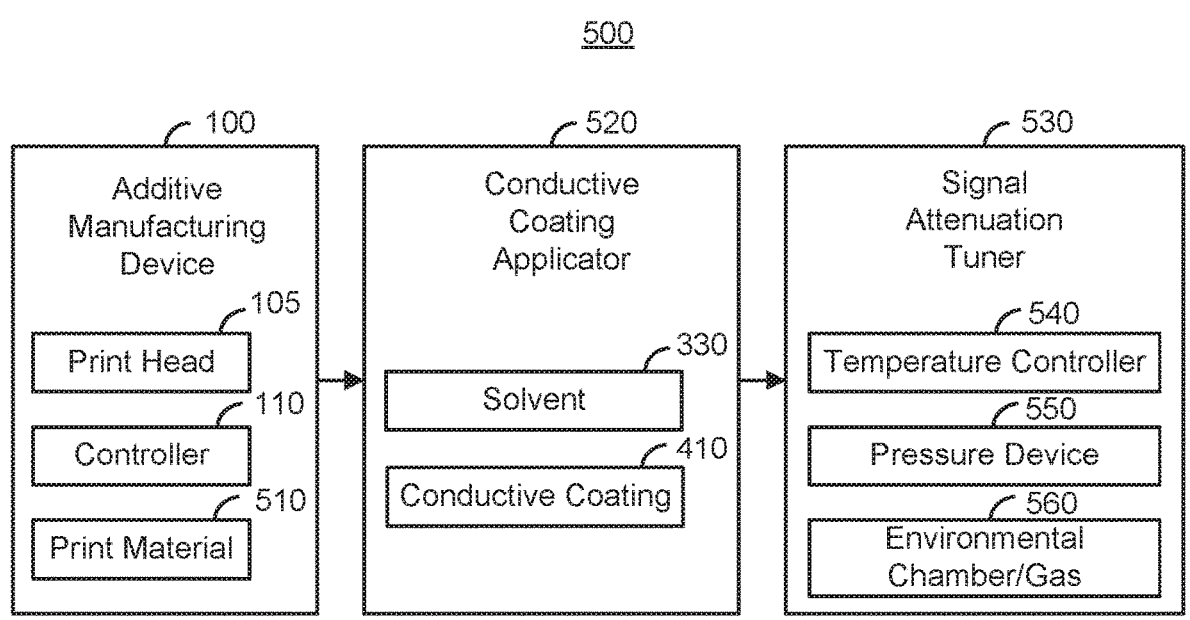
FIG. 6 Shows a block diagram of an embodiment of a system for creating a tunable waveguide.

FIG. 6 shows a block diagram of an embodiment of a system for creating a tunable waveguide. An additive manufacturing device 100 is provided in the system 500. The additive manufacturing device 100 creates the structure of the waveguide 120 utilizing an additive manufacturing layering process. As disclosed above, the additive manufacturing device 100 comprises a print head 105 and a controller 110. The material 510 from which the waveguide 120 is formed is also provided.

A conductive coating applicator 520 is shown. The applicator 520 may apply the conductive coating 410 with a layering process as discussed above. Prior to applying the conductive coating 410, the applicator 520 may also apply the solvent 330 to wash and/or alter the inner surface of the waveguide 120 in preparation for the conductive coating 410. In an embodiment, the applicator 520 may be a part of the additive manufacturing device 100 or the actual additive manufacturing device 100. When a part of the additive manufacturing device 100, the applicator 520 may utilize the same or an adjacent print head 105 that is used to build the structure of the waveguide 120.

Though not necessarily needed, depending how tuning is performed (such as is disclosed above), a signal attenuation tuner 530 is also disclosed. As disclosed above, the tuner 530 comprises a plurality of components to adjust the radius of the waveguide 120 either at a particular location or throughout the complete waveguide. Non-limiting examples of the tuner 530 include a temperature controller 540 (such as, but not limited to, a heating device), a device 550 to apply pressure to the waveguide, a chamber 560 (or house) into which a gas that would affect stability of the structure, etc. In an embodiment, the tuner 530 may comprise a plurality of the components or subsystems disclosed above.

Figure 7:
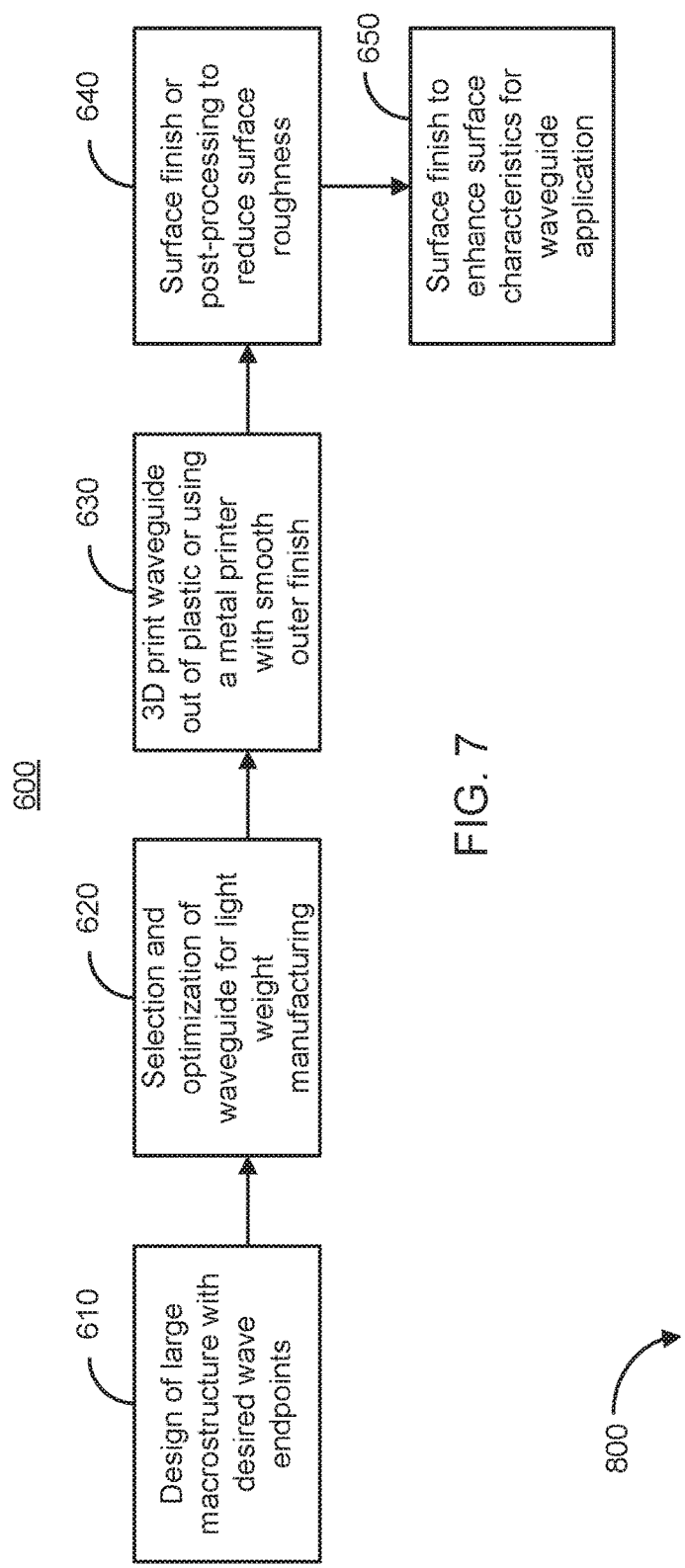
FIG. 7 shows a flow chart illustrating an embodiment of a method for manufacturing an additive manufactured waveguide.

FIG. 7 shows a flow chart illustrating an embodiment of a method for manufacturing an additive manufactured waveguide. The method 600 comprises designing a macrostructure with wave endpoints, at 610. The method also comprises selecting and optimizing the waveguide for lightweight manufacturing, at 620. The method 600 also comprises creating the waveguide structure with additive manufacturing to create a structure that has a smooth outer finish, at 630. The method 600 further comprises finishing an inner surface of the structure to reduce surface roughness, at 640. The method 600 further comprises finishing the inner surface of the structure to create signal attenuation characteristics for waveguide application, at 650. The method 600 may further comprise adjusting diameter of at least a section of the waveguide to selectively achieve signal attenuation at the section or throughout the waveguide.

Figure 8:
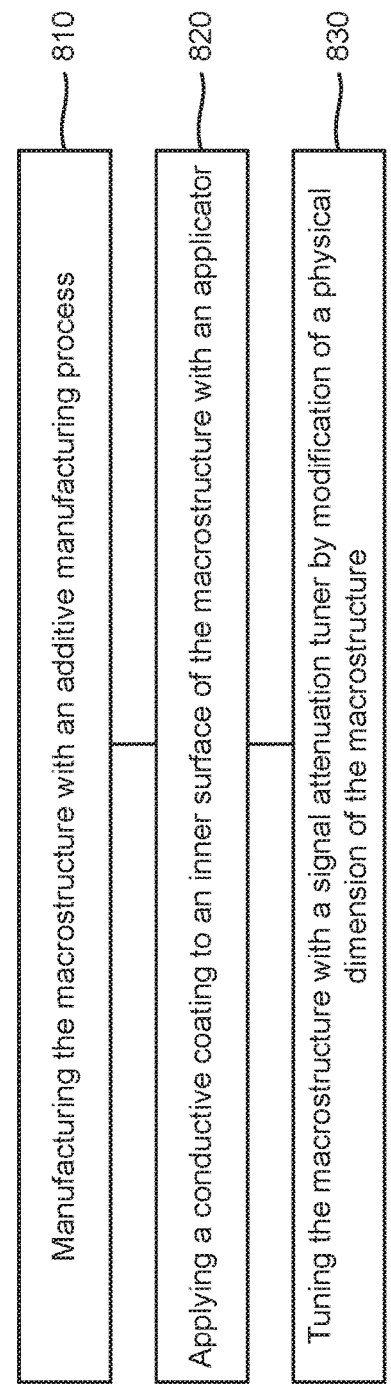
FIG. 8 shows a flowchart of an embodiment of a method for creating the complex waveguide.

FIG. 8 shows a flowchart of an embodiment of a method for creating the complex waveguide. The method 800 comprises manufacturing the macrostructure with an additive manufacturing process, at 810. The method 800 further comprises applying a conductive coating to an inner surface of the macrostructure with an applicator, at 820. The method 800 also comprises tuning the macrostructure with a signal attenuation tuner by modification of a physical dimension of the macrostructure, at 830.

The method may further comprise designing the macrostructure with wave endpoints. This may be done with a processor as disclosed below. The method may further comprise reducing an inner surface roughness of macrostructure prior to applying a solvent. The method may further reduce the inner surface roughness of the macrostructure by applying a solvent to the inner surface. The method may further comprise applying a solvent to transform the non-solid inner surface to a solid inner surface.

Tuning the macrostructure may comprise at least one of controlling temperature at a section of the macrostructure to at least one of expanding and constricting the section of the macrostructure, applying pressure to the section of the macrostructure being tuned, and engulfing the section within a gas (such as, but not limited to, within a house or housing) to affect structural stability of the section of the macrostructure. Manufacturing the macrostructure may further comprise creating the macrostructure to comprise a solid inner surface within the macrostructure and a non-solid outer surface on the macrostructure.

In another embodiment, manufacturing the macrostructure may comprise creating by the macrostructure to initially have a non-solid inner surface and non-solid outer surface. Tuning the macrostructure may comprise applying a smart material during the manufacture of the macrostructure to function as a sensor to detect at least one of an environmental condition and a signal to cause the smart material to at least one of bend, fold, shift, rotate and pivot which in turn causes the feedstock to change form in response to the at least one of bend, fold, shift, rotate and pivot of the smart material to a desired tune, and wherein the smart material is arranged to reconfigure the feedstock.

Using additive manufacturing to create the waveguide and coating the waveguide may be entirely automated, leaving a final product ready to be mounted to a utilization location. Further weight reduction may occur by dissolving or eliminating in other means, the support structure used for the coating. This method is not conventional, but seeks to redefine the production method for complex geometries. Additive manufacturing may increase surface roughness slightly, which can lead to greater signal attenuation. Tailoring surface finish to the application can reduce this problem. Additionally, the use of more reflective surface finish can also help increase signal throughput to reduce the problem and approach the efficiency of current systems.

Thus, as disclosed above, by additively manufacturing the waveguide in either metal or plastic and using appropriate coatings or surface finishing, lighter weight waveguides with more diverse shapes can be produced. This can lead to dramatic reductions in launch weight and gives greater freedom to space vehicle designers to utilize the volume more effectively as well as reducing overall time for implementation in a spacecraft or other applicable waveguide utilization location.

The device may include a computer program medium which includes a reshaping procedure when executed by a computing device to unfold and/or reshape the packaged device into a deployed (or operational) device. The reshaping procedure may include the application of controlled stimuli to one or more parts to control a shape change property of the smart material in the part. The control may control the shape change of multiple parts at different rates or at different times.

The device may include a computer program medium which includes smart material control procedures which when executed by a computing device selectively modify one or more functions of the device or part. The smart material control procedures may include he application of controlled stimuli to one or more parts.

Figure 9:
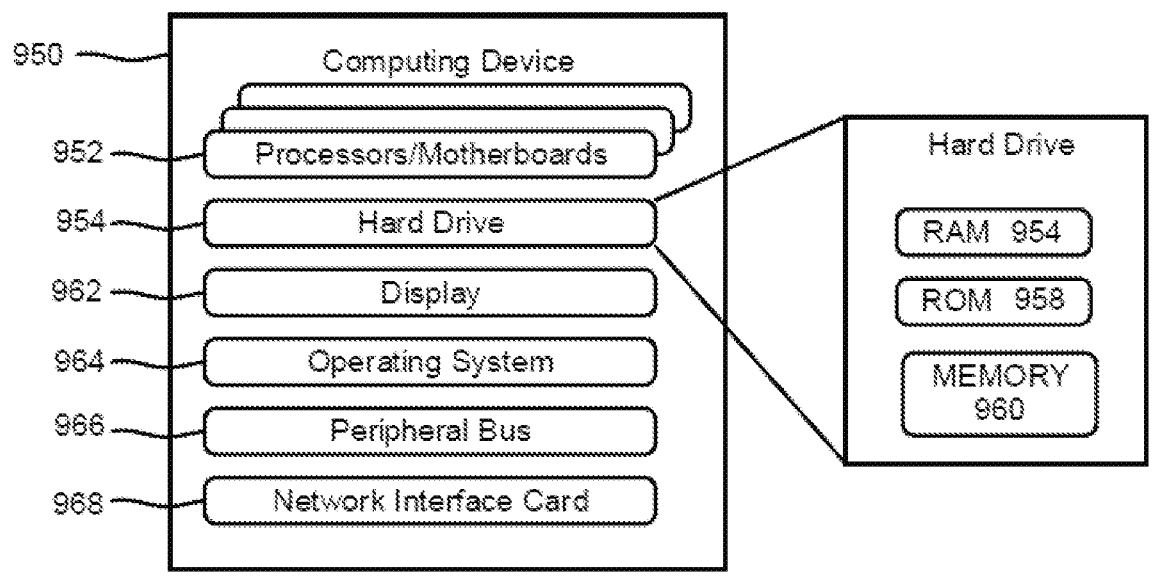
FIG. 9 shows an embodiment of a computing device.

Referring now to FIG. 9, in a basic configuration, the computing device 950 may include any type of stationary computing device or a mobile computing device. Computing device 950 may include one or more processors 952 and system memory in hard drive 954. Depending on the exact configuration and type of computing device, system memory may be volatile (such as RAM 956), non-volatile (such as read only memory (ROM 958), flash memory 960, and the like) or some combination of the two. System memory may store operating system 964, one or more applications, and may include program data for performing 3D printing. In an embodiment, the computing device during 3D manufacturing may control flight, navigation, avionics, and power management operations such as for space operations.

The computing device 950 may carry out one or more blocks of the methods disclosed above and or the additive manufacturing processes described herein. Computing device 950 may also have additional features or functionality. For example, computing device 950 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

A computing device (e.g., computing device 950) may be part of devices described herein or external sources for the application of a controlled stimuli such as, without limitation, current, for the control of smart material to effectuate shape changes in parts. The computing device 950 may be part of a system for detecting the health or status of a part by receiving sensed signals from smart materials associated with a part or device, such as a spacecraft part or device for the operation of a spacecraft. The systems and methods are not limited to spacecraft devices. In one or more embodiments, a computing device may be used to receive data acquisition signals from an active 3D printed device. In one or more embodiments, the computing device may be used to control functions of a 3D printed device.

Computing device 950 may also include or have interfaces for input device(s) (not shown) such as a keyboard, mouse, pen, voice input device, touch input device, etc. The computing device 950 may include or have interfaces for connection to output device(s) such as a display 962, speakers, etc. The computing device 950 may include a peripheral bus 966 for connecting to peripherals. Computing device 950 may contains communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 950 may include a network interface card 968 to connect (wired or wireless) to a network.

Computer program code for carrying out operations described above may be written in a variety of programming languages including, but not limited to, a high-level programming language, such as C or C++, for development convenience. In addition, computer program code for carrying out operations of embodiments described herein may also be written in other programming languages such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the functions herein is a specific algorithm, and may be shown as a mathematical formula, in the text of the specification as prose, and/or in a flow chart. The instructions of the software program create a special purpose machine for carrying out the particular algorithm. Thus, in any means-plus-function to be claimed in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system to create a continuous macrostructure, the system comprising:
   an additive manufacturing device to create a macrostructure as a continuous piece;
   an applicator to apply a conductive coating with at least one of a powder production additive manufacturing process and a layering additive manufacturing process, to an inner surface of the macrostructure and to apply a surface applicant to at least one of wash and alter a surface prior to application of the conductive coating; and
   a signal attenuation tuner to attenuate a signal by modification of a physical dimension of the macrostructure wherein the applicator further provides for at least one layer of the conductive coating having a different property than an adjacent layer.

2. The system according to claim 1, wherein the surface applicant is applied to reduce a surface roughness of the macrostructure.

3. The system according to claim 2, wherein the surface applicant comprises a solvent.

4. The system according to claim 1, wherein the signal attenuation tuner comprises at least one of a temperature controller to adjust temperature at a section of the macrostructure to at least one of expand and constrict the section of the macrostructure, a pressure device to apply pressure to the section of the macrostructure to constrict the section of the macrostructure, a chamber to house the section of the macrostructure into which a gas is supplied to affect stability of the macrostructure.

5. The system according to claim 1, wherein the additive manufacturing device creates the macrostructure to comprise a solid inner surface within the macrostructure and a non-solid outer surface.

6. The system according to claim 1, wherein the macrostructure created by the additive manufacturing device initially has a non-solid inner surface and non-solid outer surface.

7. The system according to claim 6, wherein the non-solid inner surface is transformed to a solid inner surface by the applicator.

8. The system according to claim 7, wherein the inner surface is transformed by application of a solvent.

9. The system according to claim 1, wherein the signal attenuation tuner comprises a smart material infused with feedstock as applied by the additive manufacturing device to create the macrostructure.

10. The system according to claim 9, wherein the smart material functions as a sensor to detect at least one of an environmental condition and a signal to cause the smart material to at least one of bend, fold, shift, rotate and pivot which in turn causes the feedstock to change form in response to the at least one of bend, fold, shift, rotate and pivot of the smart material to a desired tune, and wherein the smart material is arranged to reconfigure the feedstock.

11. The system according to claim 10, further comprising a processor to control the smart material.

12. The system according to claim 1, wherein the macrostructure comprises a waveguide structure.

13. A method of creating a continuous microstructure comprising:
   manufacturing a macrostructure with an additive manufacturing process;
   applying a conductive coating, with at least one of a powder production additive manufacturing process and a layering additive manufacturing process, wherein the process provides for at least one layer of conductive coating having a different property than an adjacent layer; and
   tuning the macrostructure with a signal attenuation tuner by modification of a physical dimension of the macrostructure.

14. The method according to claim 13, further comprising reducing an inner surface roughness of macrostructure prior to applying a solvent.

15. The method according to claim 14, further comprising reducing the inner surface roughness of the macrostructure by applying a solvent to the inner surface.

16. The method according to claim 13, wherein tuning the macrostructure comprises at least one of controlling temperature at a section of the macrostructure to at least one of expanding and constricting the section of the macrostructure, applying pressure to the section of the macrostructure being tuned, and engulfing the section within a gas to affect structural stability of the section of the macrostructure.

17. The method according to claim 13, wherein manufacturing the macrostructure further comprises creating the macrostructure to comprise a solid inner surface within the macrostructure and a non-solid outer surface on the macrostructure.

18. The method according to claim 13, wherein manufacturing the macrostructure comprises creating by the macrostructure to initially have a non-solid inner surface and non-solid outer surface.

19. The method according to claim 18, further comprising applying a solvent to transform the non-solid inner surface to a solid inner surface.

20. The method according to claim 13, further comprising designing a macrostructure with wave endpoints.

21. The method according to claim 13, wherein tuning the macrostructure comprises applying a smart material during the manufacture of the macrostructure to function as a sensor to detect at least one of an environmental condition and a signal to cause the smart material to at least one of bend, fold, shift, rotate and pivot which in turn causes the feedstock to change form in response to the at least one of bend, fold, shift, rotate and pivot of the smart material to a desired tune, and wherein the smart material is arranged to reconfigure the feedstock.

22. A system, the system comprising:
an additive manufacturing device to create a macrostructure wherein the additive manufacturing device initially manufactures the macrostructure with at least one of a solid inner wall and solid outer wall and a solid inner wall and porous outer wall, and a porous inner wall and porous outer wall,
an applicator to apply a conductive coating to an inner surface of the macrostructure with at least one of a powder production additive manufacturing process and a layering additive manufacturing process and to apply a solvent to the inner wall when the inner wall is porous to create a solid inner wall, wherein the applicator provides for at least one layer of the conductive coating having a different property than an adjacent layer; and
a signal attenuation tuner to attenuate a signal by modification of a physical dimension of the macrostructure.

23. The system according to claim 22, wherein the signal attenuation tuner comprises at least one of a temperature controller to adjust temperature at a section of the macrostructure to at least one of expand and constrict the section of the macrostructure, a pressure device to apply pressure to the section of the macrostructure to constrict the section of the macrostructure, a chamber to house the section of the macrostructure into which a gas is supplied to affect stability of the macrostructure.

24. The system according to claim 22, wherein the signal attenuation tuner comprises a smart material infused with feedstock as applied by the additive manufacturing device to create the macrostructure.

25. The system according to claim 24, wherein the smart material functions as a sensor to detect at least one of an environmental condition and a signal to cause the smart material to at least one of bend, fold, shift, rotate and pivot which in turn causes the feedstock to change form in response to the at least one of bend, fold, shift, rotate and pivot of the smart material to a desired tune, and wherein the smart material is arranged to reconfigure the feedstock.

26. The system according to claim 24, further comprising a processor to control the smart material.

* * * * *